United States Patent
Liao

(10) Patent No.: US 6,739,736 B2
(45) Date of Patent: May 25, 2004

(54) RADIATING SYSTEM FOR PROJECTOR DEVICE

(75) Inventor: Wen Neng Liao, Hsinchu (TW)

(73) Assignee: Lite-On Technology Corp., Taipei (TW)

(*) Notice: Subject to any disclaimer, the term of this patent is extended or adjusted under 35 U.S.C. 154(b) by 0 days.

(21) Appl. No.: 10/270,727

(22) Filed: Oct. 16, 2002

(65) Prior Publication Data

US 2004/0076009 A1 Apr. 22, 2004

(51) Int. Cl.⁷ ............................................. F21V 29/00
(52) U.S. Cl. ..................... 362/294; 362/96; 362/345; 362/373
(58) Field of Search ........................ 362/294, 345, 362/373, 96, 364, 365, 437

(56) References Cited

U.S. PATENT DOCUMENTS 4,935,853 A * 6/1990 Collins ...................... 362/272
5,924,791 A * 7/1999 Arai et al. .................. 362/373
5,961,203 A * 10/1999 Schuda ....................... 362/294
6,286,980 B1 * 9/2001 Meyer ........................ 362/365
6,575,599 B1 * 6/2003 Imamura et al. ............ 362/294

* cited by examiner

Primary Examiner—John Anthony Ward
(74) Attorney, Agent, or Firm—Browdy and Neimark, P.L.L.C.

(57) ABSTRACT

A radiating system for projector device includes a ventiduct structure with a ventiduct space, a light source having a lamp center and arranged in the ventiduct space, a baffle provided around the light source to divide the ventiduct space into a first ventiduct space and a second ventiduct space, and an arc-shaped inner bend provided for communicating the first ventiduct space and the second ventiduct space. A lamp radiating fan inhales an air blowing toward the lamp center and a radiating fan drains the air out it of the second ventiduct space to carry away a heat generated by the light source.

6 Claims, 5 Drawing Sheets

RADIATING SYSTEM FOR PROJECTOR DEVICE

FIELD OF THE INVENTION

The present invention relates to a radiating system for projector device, especially to a radiating system for projector device with enhanced heat dissipation effect and reduced size.

BACKGROUND OF THE INVENTION

Projector devices have rapid progress as the advance of optical and projection technologies. More particularly, the sizes and cost of the projector devices are reduced such that the projector devices are extensively used for presentation, meeting, educational training or even home entertainment. The development trends of the projector devices are high image quality, high brightness, compact size, and low price.

However, to achieve high brightness, the projector devices should adopt light source with higher power. Therefore, the projector devices requires larger radiating fan with serious noise and bulk radiating system.

FIG. 1 shows a conventional radiating system comprising a ventiduct structure 10a with a ventiduct space 20a. A lamp 40a is placed in the ventiduct space 20a. The radiating system further comprises a lamp radiating fan 60a and a radiating fan 70a arranged on two sides of the lamp 40a, respectively. The lamp radiating fan 60a is used to inhale an air for blowing a lamp center 30a of the lamp 40a, and the radiating fan 70a is functioned to draw a relatively cool air into the ventiduct space 20a and drain a relatively hot air out of the ventiduct space 20a.

FIG. 2 shows another conventional radiating system comprising a ventiduct structure 10a with a ventiduct space 20a. The radiating system further comprises a lamp radiating fan 60a and a radiating fan 70a arranged on two sides of the lamp 40a, respectively. Similarly, the lamp radiating fan 60a is used to inhale an air for blowing a lamp center 30a of the lamp 40a, and the radiating fan 70a is functioned to draw a relatively cool air into the ventiduct space 20a and drain a relatively hot air out of the ventiduct space 20a.

However, in above-mentioned two conventional radiating systems, the lamp radiating fan 60a is arranged at such location that the air inhaled by the lamp radiating fan 60a will not directly blow at the lamp center 30a of the lamp 40a, thus degrading the heat dissipation effect of the conventional radiating systems. Moreover, the lamp radiating fan 60a and the radiating fan 70a are arranged on two sides of the lamp 40a, the volume of the conventional radiating systems is inevitably bulky.

SUMMARY OF THE INVENTION

It is the object of the present invention to provide a radiating system for projector device with enhanced heat dissipation effect and reduced size.

In one aspect of the present invention, a baffle is provided to divided a ventiduct structure into a first ventiduct structure and a second ventiduct structure, and to divide a ventiduct space into a first ventiduct space and a second ventiduct space, thus enhancing the heat dissipation effect.

In another aspect of the present invention, a lamp radiating fan and a radiating fan are arranged at the same side of the lamp.

To achieve above object, the present invention provides a radiating system for projector device comprising a ventiduct structure with a ventiduct space; a light source having a lamp center and arranged in the ventiduct space; a baffle provided around the light source to divide the ventiduct structure into a first ventiduct structure and a second ventiduct structure, and to divide the ventiduct space into a first ventiduct space and a second ventiduct space, wherein the first ventiduct structure has a first air inlet and a first air outlet at two ends thereof, respectively, and the second ventiduct structure has a second air inlet and a second air outlet at two ends thereof, respectively, and the first air outlet is communicated with the second ventiduct space; a lamp radiating fan provided at an inner side of the of the first air inlet of the first ventiduct structure; and a radiating fan provided at an inner side of the of the second air outlet of the second ventiduct structure.

The various objects and advantages of the present invention will be more readily understood from the following detailed description when read in conjunction with the appended drawing, in which:

DETAILED DESCRIPTION OF THE INVENTION

Figure 1:
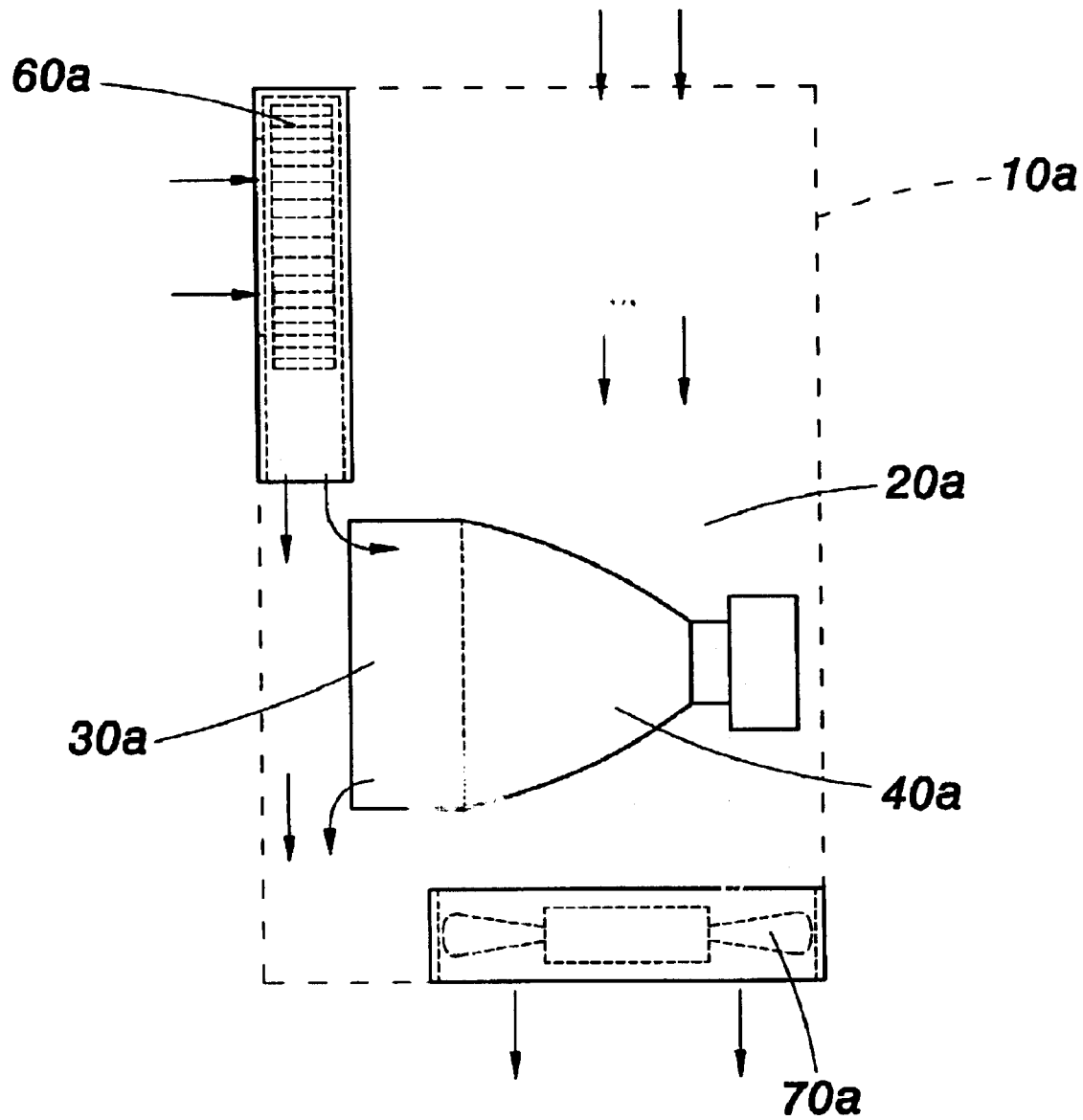
FIG. 1 shows a conventional radiating system.
Figure 2:
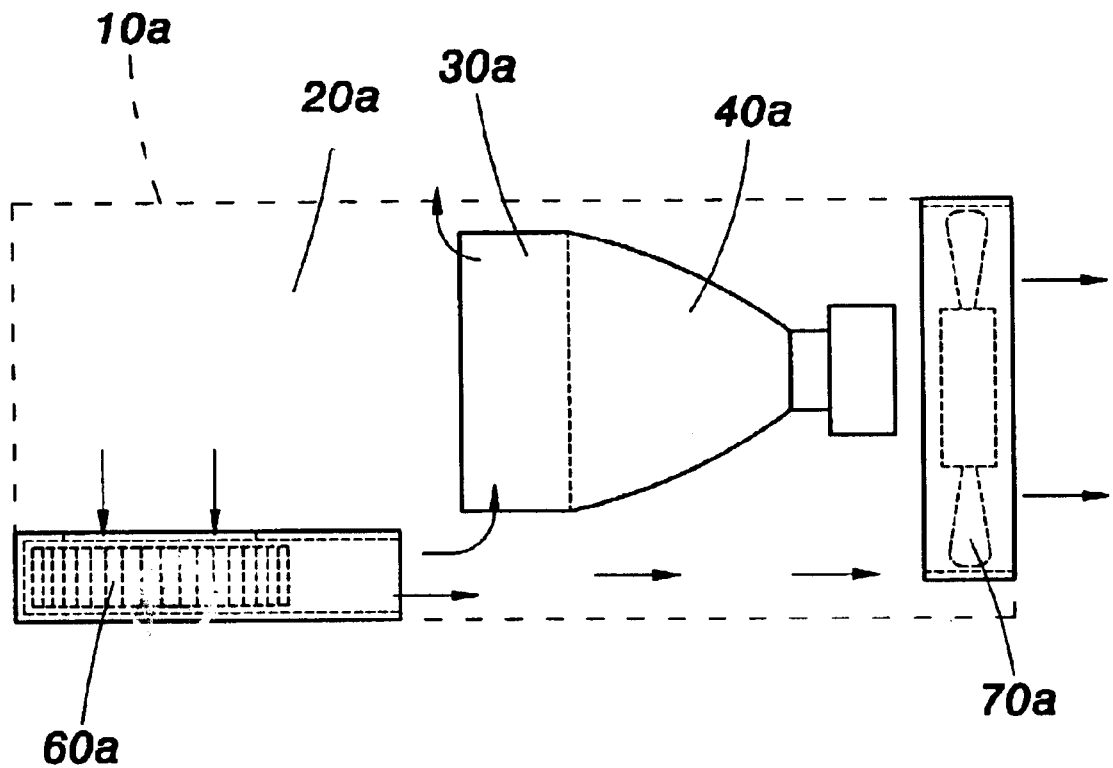
FIG. 2 shows another conventional radiating system.
Figure 3:
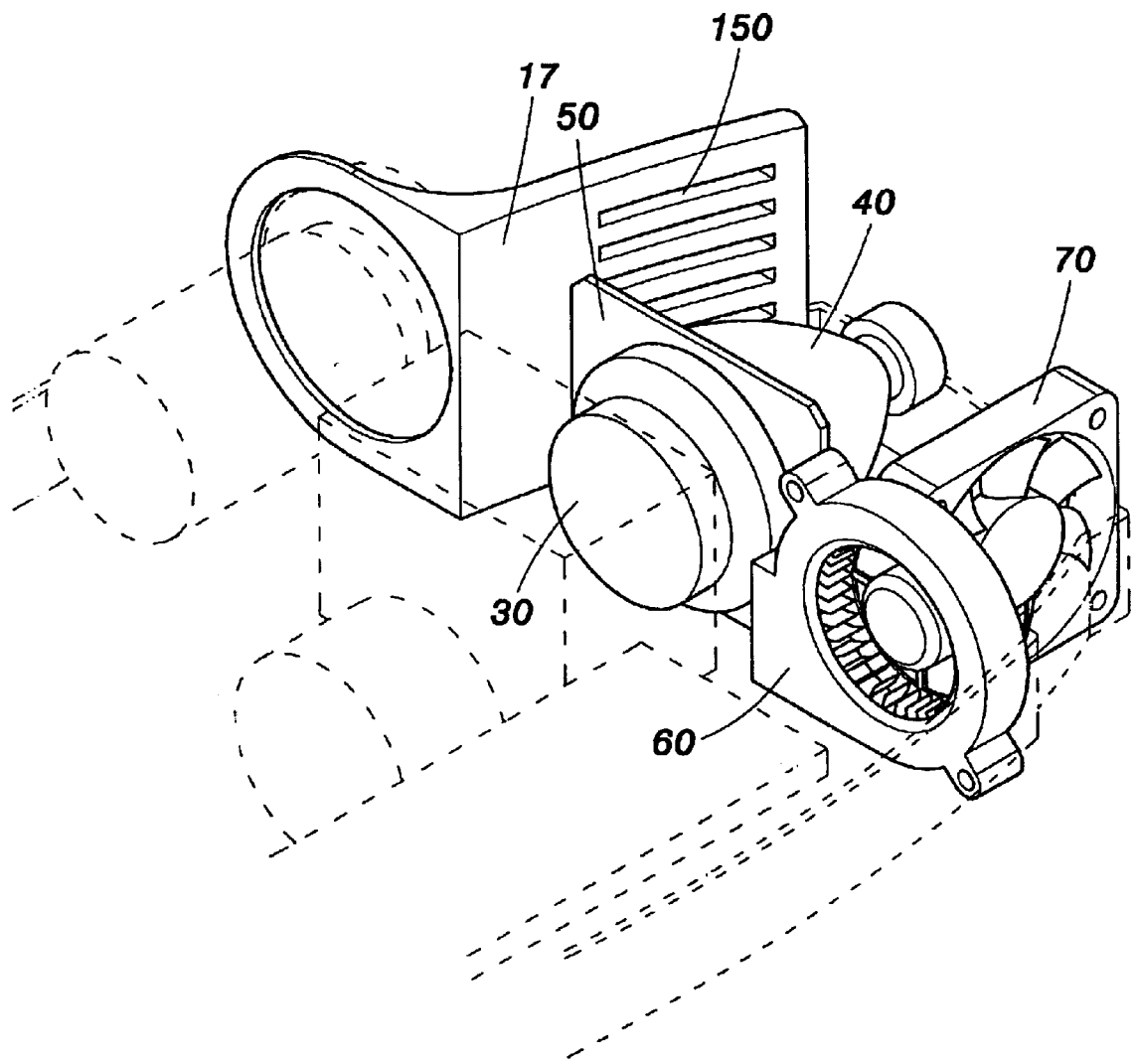
FIG. 3 shows a perspective view of the radiating system of the present invention.
Figure 4:
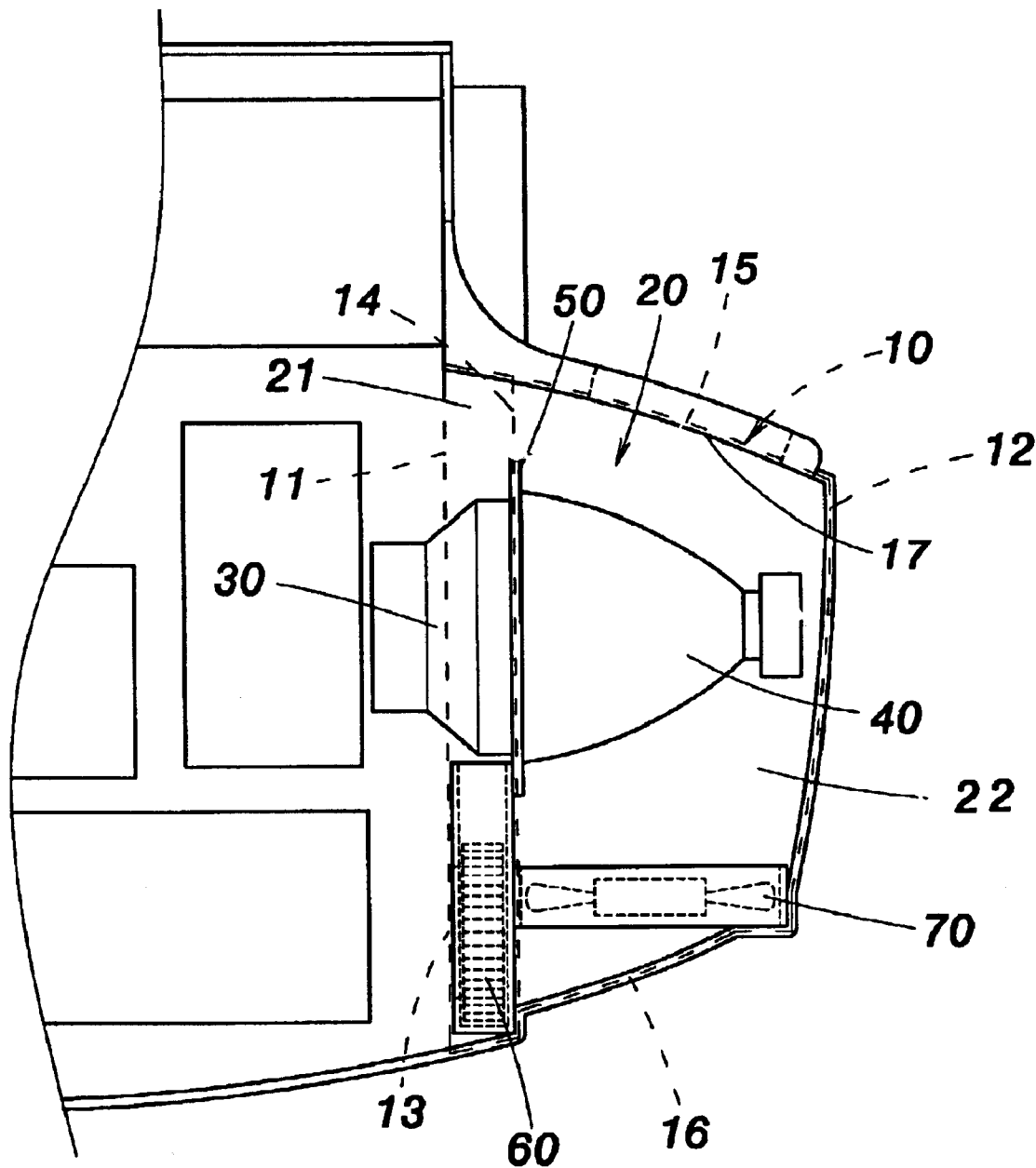
FIG. 4 shows a top view of the radiating system of the present invention.

With reference now to FIGS. 3 and 4, the present invention provides a radiating system for projector device. The radiating system according to the present invention comprises a ventiduct structure 10 with a ventiduct space 20. A light source (such as a lamp 40) having a lamp center 30 is arranged in the ventiduct space 20 of the ventiduct structure 10. The radiating system according to the present invention further comprises a baffle 50 provided around the lamp 40 to divide the ventiduct structure 10 into a first ventiduct structure 11 and a second ventiduct structure 12, and to divide the ventiduct space 20 into a first ventiduct space 21 and a second ventiduct space 22. The first ventiduct structure 11 has a first air inlet 13 and a first air outlet 14 at two ends thereof, respectively. The second ventiduct structure 12 has a second air inlet 15 and a second air outlet 16 at two ends thereof, respectively. Moreover, an arc-shaped inner bend 17 is provided for communicating the first air outlet 14 of the first ventiduct structure 11 and the second ventiduct structure 12. A lamp radiating fan 60 is provided at an inner side of the of the first air inlet 13 of the first ventiduct structure 11. A radiating fan 70 is provided at an inner side of the of the second air outlet 16 of the second ventiduct structure 12. The second air inlet 15 of the second ventiduct structure 12 has a plurality of transversal inlet openings 150, and the second air outlet 16 of the second ventiduct structure 12 also has a plurality of transversal outlet openings (not shown).

Figure 5:
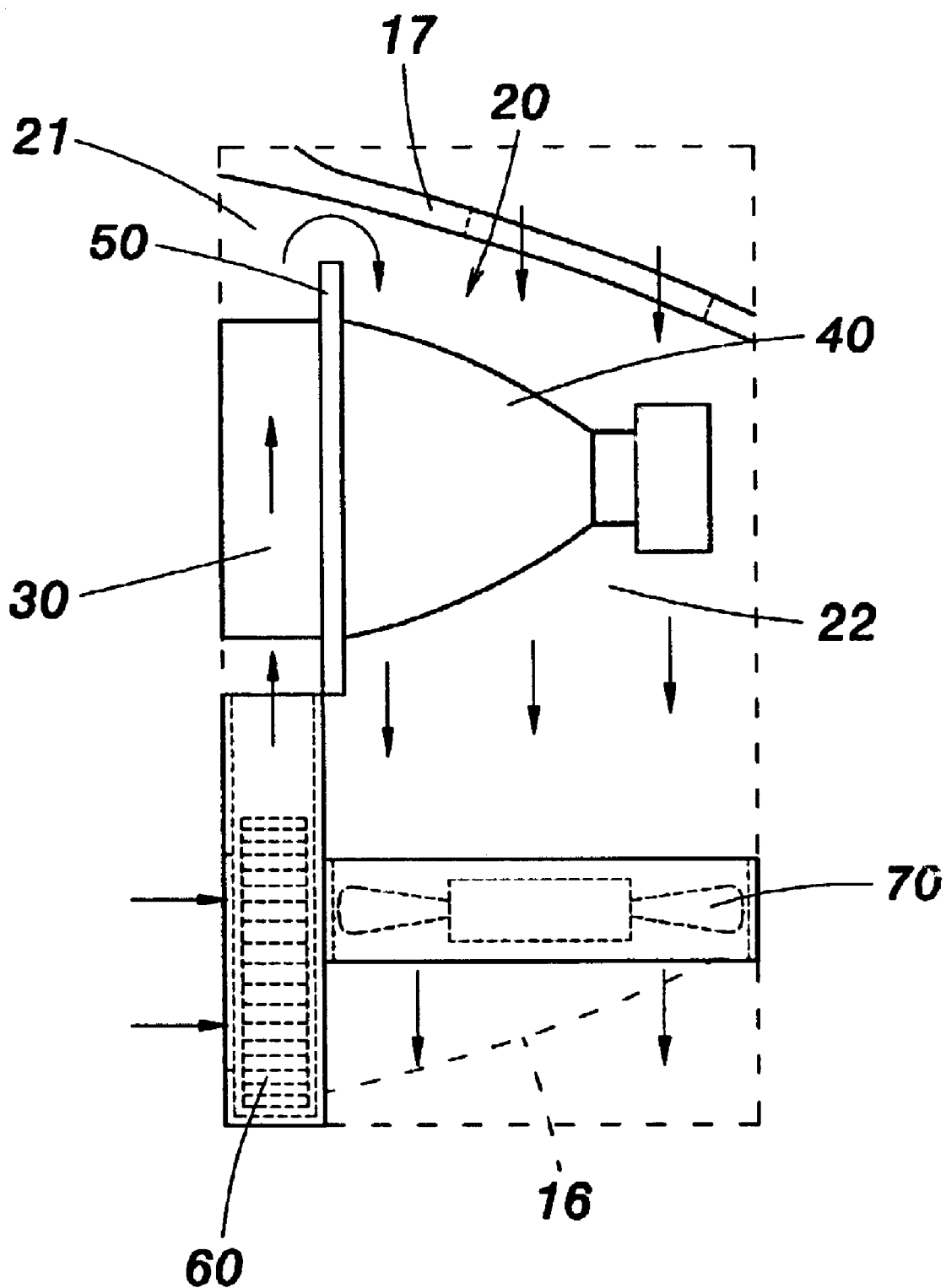
FIG. 5 shows a top view of the radiating system of the present invention, wherein an air flowing direction is depicted.

FIG. 5 shows a top view of the radiating system according to the present invention, wherein an air flowing direction is depicted. The lamp radiating fan 60 is provided at the inner side of the of the first air inlet 13 of the first ventiduct structure 11 and inhales an air, which will directly blow at the lamp center 30 of the lamp 40. Afterward, the air inhaled by the lamp radiating fan 60 flows form the first ventiduct structure 11 into the second ventiduct space 22 through the first air outlet 14 of the first ventiduct structure 11. The radiating fan 70 is provided at the inner side of the of the second air outlet 16 of the second ventiduct structure 12. Therefore, the radiating fan 70 also inhales a relatively cool air from the second air inlet 15 of the second ventiduct structure 12 for heat dissipation, and removes heat of the lamp 40 out of the second ventiduct space 22 by draining an air through the second air outlet 16 of the second ventiduct structure 12. Therefore, the radiating system according to the present invention has enhanced heat dissipation effect and reduced size.

Although the present invention has been described with reference to the preferred embodiment thereof, it will be understood that the invention is not limited to the details thereof various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A radiating system for a projector device, comprising:

a ventiduct structure having a ventiduct space formed therein;

a light source arranged in the ventiduct space and having a lamp center;

an annular baffle surrounding the light source to divide the ventiduct structure in to a first ventiduct structure having a first ventiduct space and a second ventiduct structure having a second ventiduct space, wherein the first ventiduct structure has a first air inlet and a first air outlet at two opposing ends thereof, the second ventiduct structure has a second air inlet and a second air outlet at two opposing ends thereof, the first air outlet communicates with the second ventiduct space, and the first and second ventiduct spaces form an air flow path in which the first and second ventiduct spaces are arranged in series with one another;

a lamp radiating fan disposed adjacent to the light source at a lateral side thereof and at an inner side of the first air inlet of the first ventiduct structure, and being parallel to the baffle; and a second radiating fan disposed adjacent to the light source at the lateral side thereof and adjacent to the lamp radiating fan simultaneously, at an inner side of the of the second air outlet of the second ventiduct structure, and being perpendicular to the baffle;

whereby the lamp radiating fan draws air into the first ventiduct space through the first air inlet, the air flows through the first air outlet to the second ventiduct space, and the second radiating fan exhausts the air through and out of the second air outlet to carry away a heat generated by the light source.

2. The radiating system for projector device as in claim 1, wherein the second air inlet has a plurality of transversal inlet openings oriented parallel to one another and disposed opposite to the second radiating fan.

3. The radiating system for projector device as in claim 1, wherein the second air outlet has a plurality of transversal outlet openings oriented parallel to one another and disposed adjacent to the second radiating fan.

4. The radiating system for projector device as in claim 1, wherein the first ventiduct structure has an arc-shaped inner bend for providing air flow communication from the first air outlet to the second ventiduct space.

5. The radiating system for projector device as in claim 1, wherein the light source is a lamp.

6. The radiating system for projector device as in claim 1, wherein the air flow path has a first path portion and a second path portion and air flow in said first path portion is substantially parallel to air flow in said second path portion.

* * * * *